US012317768B2

(12) United States Patent
Kiel

(10) Patent No.: US 12,317,768 B2
(45) Date of Patent: Jun. 3, 2025

(54) AUTOMATIC TERRAIN ADJUSTMENT SYSTEM FOR AN AGRICULTURAL IMPLEMENT

(71) Applicant: Christian Kiel, Crookston, MN (US)

(72) Inventor: Christian Kiel, Crookston, MN (US)

( * ) Notice: Subject to any disclaimer, the term of this patent is extended or adjusted under 35 U.S.C. 154(b) by 554 days.

(21) Appl. No.: 17/846,248

(22) Filed: Jun. 22, 2022

(65) Prior Publication Data

US 2023/0413708 A1 Dec. 28, 2023

(51) Int. Cl.
*A01B 63/22* (2006.01)

(52) U.S. Cl.
CPC .................................. *A01B 63/22* (2013.01)

(58) Field of Classification Search
CPC ......... A01B 63/00; A01B 63/14; A01B 63/16; A01B 63/22
USPC ...................................................... 180/20, 21
See application file for complete search history.

(56) References Cited

U.S. PATENT DOCUMENTS

| 4,600,060 | A | * | 7/1986 | Winter | A01B 63/32 |
| | | | | | 172/4 |
| 7,055,616 | B1 | | 6/2006 | Kiel | |
| 7,401,455 | B1 | | 7/2008 | Cleodolphi | |
| 8,245,489 | B2 | | 8/2012 | Talbot | |
| 8,452,501 | B1 | | 5/2013 | Lange | |
| 8,738,244 | B2 | | 5/2014 | Lenz | |
| 8,915,308 | B2 | | 12/2014 | Joergensen | |
| 8,943,788 | B2 | | 2/2015 | Miller | |
| 9,980,431 | B2 | | 5/2018 | Long | |
| 11,058,056 | B2 | | 7/2021 | Pierson | |
| 2008/0142234 | A1 | * | 6/2008 | Friggstad | A01B 63/32 |
| | | | | | 172/327 |
| 2014/0379230 | A1 | * | 12/2014 | Koch | A01B 63/1145 |
| | | | | | 172/663 |
| 2017/0273231 | A1 | * | 9/2017 | Nolte | A01B 63/22 |
| 2020/0053941 | A1 | * | 2/2020 | Sporrer | A01B 63/10 |
| 2020/0100420 | A1 | * | 4/2020 | Sporrer | A01B 63/1112 |
| 2020/0375106 | A1 | | 12/2020 | Seiders, Jr. | |
| 2024/0260562 | A1 | * | 8/2024 | Kremesec | A01B 63/163 |

FOREIGN PATENT DOCUMENTS

| BR | 102019025980 | A2 | * | 6/2021 | .......... A01B 61/044 |
| CA | 3048851 | A1 | * | 2/2020 | .......... A01B 63/002 |
| EP | 1147699 | A1 | * | 10/2001 | ............ A01B 63/22 |
| SE | 1150222 | A1 | * | 9/2012 | |
| WO | WO-2017101950 | A1 | * | 6/2017 | .......... A01B 63/114 |
| WO | WO-2022093101 | A1 | * | 5/2022 | ............. A01B 19/10 |

* cited by examiner

*Primary Examiner* — Jason D Shanske
*Assistant Examiner* — Daniel M. Keck
(74) *Attorney, Agent, or Firm* — Neustel Law Offices

(57) ABSTRACT

An automatic terrain adjustment system automatically adjusts the forward and rearward height of a tractor-towed agricultural implement, such as a defoliator, responsive to a sensed change in the depth of terrain over which the agricultural implement traverses. The forward height of the implement is adjusted independently of the rearward height of the implement using two distinct automatic depth controlling systems. Each automatic depth controlling system utilizes a linkage in conjunction with a sensing wheel and hydraulic valve to control either a rear actuator, which adjusts a height of a rear axle of the implement, or a forward actuator, which adjusts a height of the front of the implement.

20 Claims, 5 Drawing Sheets

AUTOMATIC TERRAIN ADJUSTMENT SYSTEM FOR AN AGRICULTURAL IMPLEMENT

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to terrain adjustment systems for height-sensitive agricultural implements such as, for example, a defoliator.

Height-sensitive agricultural implements are those implements that are towed by a tractor and whose optimal operation is dependent upon the height or depth at which the agricultural implement traverses the terrain of a field. In the instance of a defoliator, an optimal height will enable the defoliator to remove crop foliage without damaging the underlying harvestable product, e.g., removing sugar beet foliage without damaging the underlying sugar beet. Unfortunately, the optimal height can vary from one side of the agricultural implement to the other side of the agricultural implement. As such, there is a need for a system that can responsively adjust the forward and rearward height of an agricultural implement based on a depth of terrain that the agricultural implement is traversing.

SUMMARY

The present disclosure is directed to an automatic terrain adjustment system used to automatically adjust the forward and rearward height of a tractor-towed agricultural implement, such as a defoliator, responsive to a sensed change in the depth of terrain over which the agricultural implement traverses. The automatic terrain adjustment system uses one or both of a right and left automatic depth controlling system to achieve the desired functionality.

In certain aspects, the present disclosure is directed to a right automatic depth controlling system to control a rearward height of the agricultural implement and, more specifically, control the height of a rear wheel assembly that supports a rear of the agricultural implement. The right automatic depth controlling system utilizes a right linkage, secured to a front of the agricultural implement at a right side of the agricultural implement, in conjunction with a right hydraulic valve and a right forward wheel assembly to control a height of the rear wheel assembly via a rear actuator coupled between a rear of the agricultural implement and a rear axle of the rear wheel assembly. The movable right linkage enables the right sensing wheel of the right forward wheel assembly to sense a depth of terrain while also adjusting flow from the right hydraulic valve to the rear actuator enabling the rear axle of the rear wheel assembly to achieve a depth of terrain corresponding to the sensed depth of terrain and a desired rear height of the agricultural implement.

In certain aspects, the present disclosure is directed to a left automatic depth controlling system to control the height of a front of the agricultural implement. The left automatic depth controlling system utilizes a left linkage, secured to a front of the agricultural implement at a left side of the agricultural implement, in conjunction with a left hydraulic valve and a left forward wheel assembly to control the height of the front of the agricultural implement via a forward actuator coupled between a front member of the agricultural implement and the tongue of the agricultural implement. The movable left linkage enables the left sensing wheel of the left forward wheel assembly to sense a depth of terrain while also adjusting flow from the left hydraulic valve to the forward actuator enabling the front of the agricultural implement to achieve a desired front height corresponding to the sensed depth of terrain.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Figure 1:
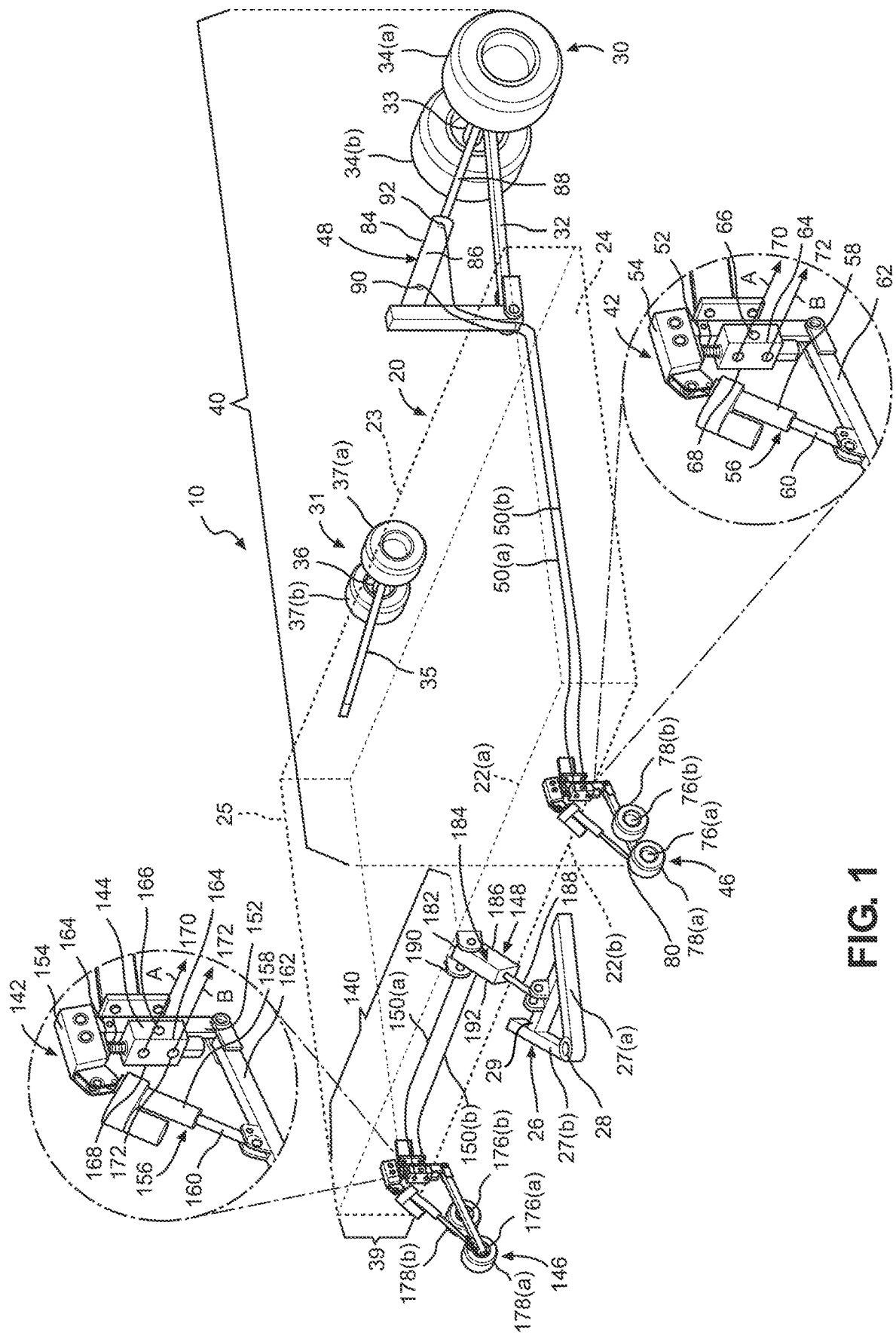
FIG. 1 is a perspective view of an agricultural implement equipped with an automatic terrain adjustment system in accordance with an example embodiment.

With reference to FIGS. 1-5, the present disclosure relates to an automatic terrain adjustment system 10 that functions to automatically adjust the forward and/or rearward height of an agricultural implement 20, such as a defoliator, responsive to a sensed change in the depth of terrain over which the agricultural implement 20 is traversing. The automatic terrain adjustment system 10 can use one or both of a right automatic depth controlling system 40 and a left automatic depth controlling system 140 to achieve the desired functionality.

The right automatic depth controlling system 40 includes a right linkage 42, a right hydraulic valve 44, a right forward wheel assembly 46 and a rear actuator assembly 48. The right linkage 42 couples a right sensing wheel 78(a) of the right forward wheel assembly 46 with the right hydraulic valve 44. Further, the right linkage 42 is secured to a forward member 22 of the agricultural implement 20 proximate a right side 24 of the agricultural implement 20. A right hydraulic actuator comprising a rear hydraulic actuator 84 of the rear actuator assembly 48 is fluidly coupled to the right hydraulic valve 44. The rear hydraulic actuator 84 is connected between a rear member 23 of the agricultural implement 20 and a height-adjustable right axle 33 of the right wheeled support 30 of the agricultural implement 20; the height-adjustable right axle 33 is connected between right wheels 34(a), 34(b) that serve to support the right side 24 of the agricultural implement 20.

Movement of the right linkage 42 enables the right sensing wheel 78(a) to sense a right depth of terrain as the right sensing wheel 78(a) traverses the terrain while the agricultural implement 20 is towed by a tractor. Responsive to the right depth of terrain, the right hydraulic valve 44 supplies hydraulic fluid to the rear hydraulic actuator 84 to position the height-adjustable axle 33 to a height corresponding to the right depth of terrain and a desired rear height of the agricultural implement 20.

In certain embodiments, the right linkage 42 comprises a four-member linkage wherein at least one of the four members comprises a right electrical actuator 56. The right electrical actuator 56 has a predetermined length that establishes a zero depth of the right sensing wheel 78(a). In certain embodiments, the right sensing wheel 78(a) comprises at least two right sensing wheels 78(a), 78(b). In a two-wheeled configuration, one 78(b) of the at least two right sensing wheels is positioned behind and in-line with a second 78(a) of the at least two right sensing wheels. In certain embodiments, the right hydraulic valve 44 includes a single spring-actuated spool 64 that is actuated by a member, such as top member 54, of the right linkage 42.

The left automatic depth controlling system 140 includes a left linkage 142, a left hydraulic valve 144, a left forward wheel assembly 146 and a left forward actuator assembly 148. The left linkage 142 couples a left sensing wheel 178(a) of the left forward wheel assembly 146 with the left hydraulic valve 144. Further, the left linkage 142 is secured to a forward member 22 of the agricultural implement 20 proximate a left side 25 of the agricultural implement 20. A left hydraulic actuator comprising a forward hydraulic actuator 184 of the forward actuator assembly 148 is fluidly coupled to the left hydraulic valve 144. The forward hydraulic actuator 184 is connected between a forward member 22 of the agricultural implement 20 and a tongue 26 of the agricultural implement 20.

Movement of the left linkage 142 enables the left sensing wheel 178(a) to sense a left depth of terrain as the left sensing wheel 178(a) traverses the terrain while the agricultural implement 20 is towed by a tractor. Responsive to the left depth of terrain, the left hydraulic valve 144 supplies hydraulic fluid to the forward hydraulic actuator 184 to adjust a height of a front 39 of the agricultural implement 20 corresponding to the left depth of terrain.

In certain embodiments, the left linkage 142 comprises a four-member linkage wherein at least one of the four members comprises a left electrical actuator 156. The left electrical actuator 156 has a predetermined length that establishes a zero depth of the left sensing wheel 178(a). In certain embodiments, the left sensing wheel 178(a) comprises at least two left sensing wheels 178(a), 178(b). In a two-wheeled configuration, one 178(b) of the at least two left sensing wheels is positioned behind and in-line with a left 178(a) of the at least two left sensing wheels. In certain embodiments, the left hydraulic valve 144 includes a single spring-actuated spool 164 that is actuated by a member, such as top member 154, of the left linkage 142.

B. Agricultural Implement

Figure 3:
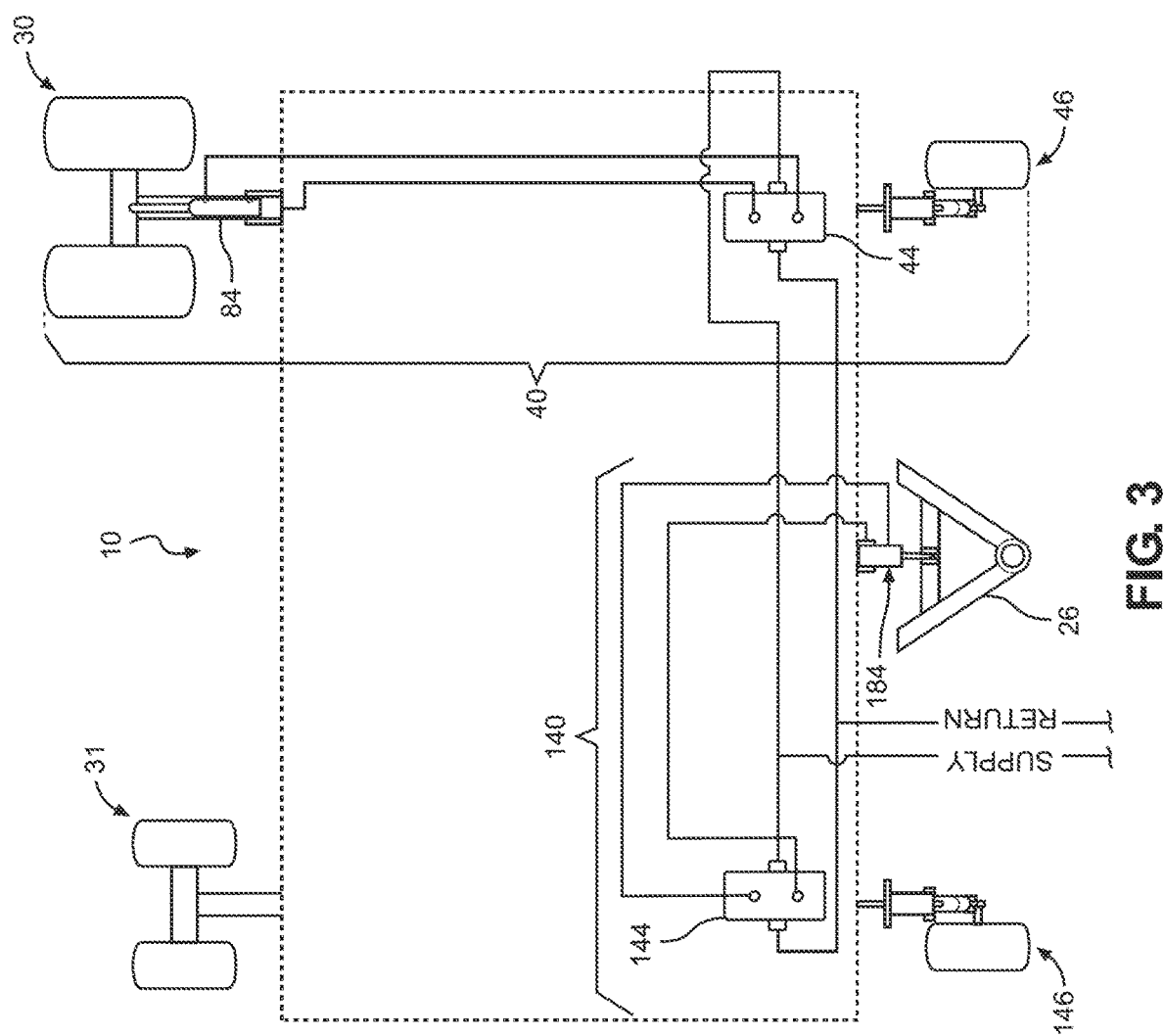
FIG. 3 is a plan view of the agricultural implement equipped with an automatic terrain adjustment system illustrating an example hydraulic layout for the automatic terrain adjustment system.

The automatic terrain adjustment system 10 works in conjunction with an agricultural implement 20, such as a defoliator or tiller, as described herein. FIGS. 1 and 3 illustrate a simplified example configuration of one such agricultural implement 20, namely, a defoliator.

As shown, the agricultural implement 20 includes a body structure 21 in which defoliating blades (not shown) are mounted. The body structure 21 is generally defined by an forward member 22, a rear member 23, a right side member 24, and a left side member 25. The right and left side members 24, 25 serve to connect the forward member 22 and rear member 23. A tongue 26, having a first arm 27(a) and a second side arm 27(b), is pivotally secured to the body structure 21 at the lower forward member 22(b) and includes a hitch 28 that enables the agricultural implement 20 to be coupled to, and towed by, a tractor (not shown). The tongue 26 additionally includes a cross member 29 that is positioned intermediate the first and second side arms 27(a), 27(b).

The agricultural implement 20 additionally includes two wheeled supports including a right wheeled support 30 proximate the right side member 24 and a left wheeled support 31 proximate the left side member 25. The right wheeled support 30 includes a right extension arm 32 that is pivotally secured at a first end to the rear member 23 to enable up/down motion of the right extension arm 32. A right axle 33 is pivotally secured to a second end of the right extension arm 32 to enable rotatable side-to-side motion of the right axle 33 and of the right wheels 34(a), 34(b) mounted on either side of the right axle 33. The left wheeled support 31 includes a left extension arm 35 that is fixedly secured at a first end to the rear member 23. A left axle 36 is fixedly secured to a second end of the left extension arm 35; left wheels 37(a), 37(b) are mounted to either side of the left axle 36.

It should be appreciated that the agricultural implement 20 described herein is a simplified version of an agricultural implement 20. An actual agricultural implement is typically of a more complicated design having a plurality of forward members, a plurality of rear members, a plurality of side members and/or a plurality of intermediate members positioned between and oriented parallel to the forward and rear members to support blades, discs, etc. Further, an actual agricultural implement can have a greater or fewer number of wheeled supports than what is described herein.

C. Right Automatic Depth Controlling System

The right automatic depth controlling system 40 generally comprises a right linkage 42, a right hydraulic valve 44, a right forward wheel assembly 46, a rear actuator assembly 48, and right hydraulic lines 50(a), 50(b) that serve to fluidly couple the right hydraulic valve 44 to the rear actuator assembly 48. The right automatic depth controlling system 40 operates independently of the left automatic depth controlling system 140.

a. Right Linkage.

The right linkage 42 is generally a four-member linkage where each member of the right linkage 42 is of a rigid construction and a fixed length. More specifically, the right linkage 42 includes a right vertical member 52 that is fixedly secured to the forward member 22 of the agricultural implement 20. The right linkage 42 additionally includes a right top member 54 having a first end that is pivotally secured to a top end of the right vertical member 52. The right linkage 42 also includes a right electrical actuator 56 having a right cylinder 58 that is pivotally secured to a second end of the right top member 54 and a right piston rod 60 that is pivotally secured to a first end of a right lower member 62. The right electrical actuator 56, is electrically controlled, such as through use of a tractor electrical system, to maintain a predetermined setting to establish the right electrical actuator 56 as a fixed-length, rigid member within the right linkage 42. The right linkage 42 is completed with a second end of the right lower member 62 being pivotally secured to a bottom end of the right vertical member 52. Each of the right vertical member 52, right top member 54, right cylinder 58, right piston rod 60, and right lower member 62 are preferably fabricated from steel or other suitable metal alloy.

b. Right Hydraulic Valve.

Figure 2:
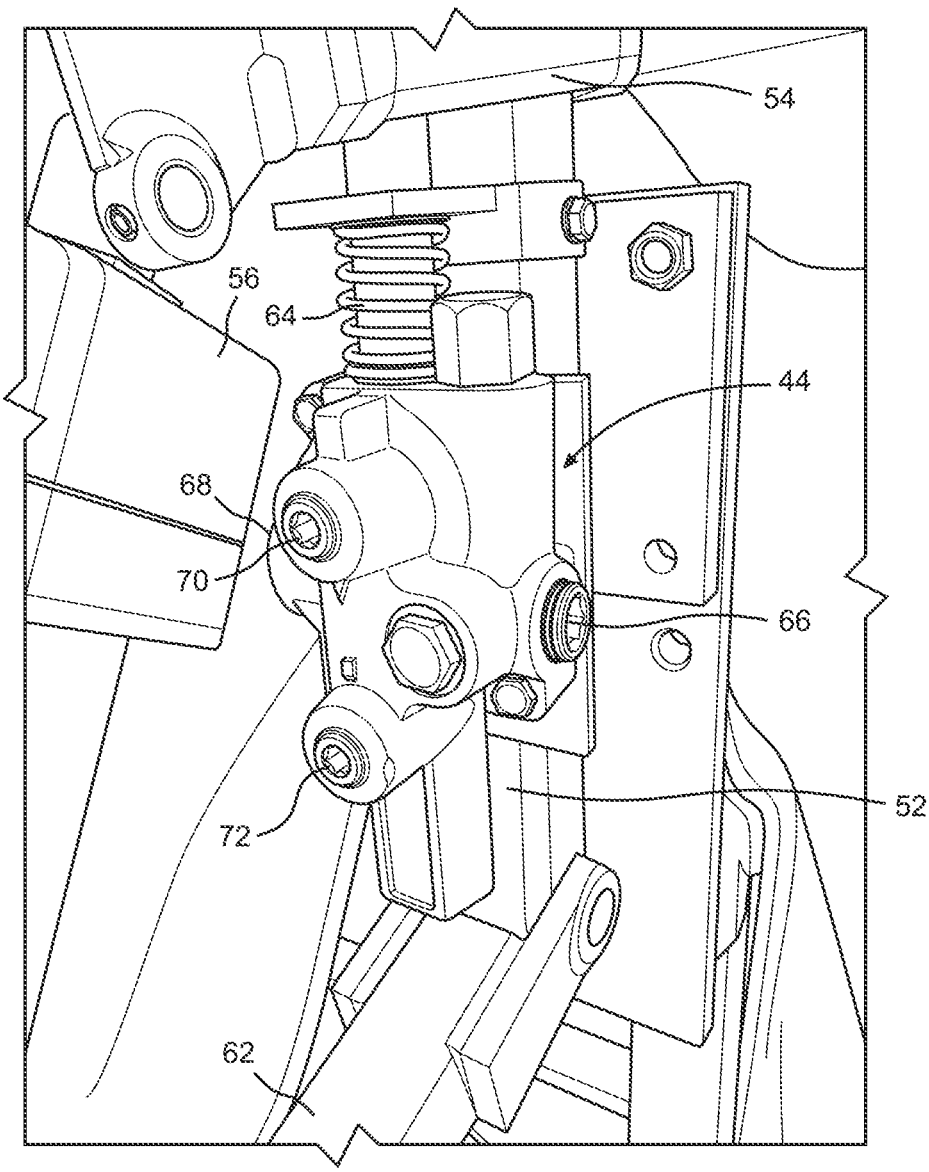
FIG. 2 is a perspective view of an example hydraulic valve that can be used in the automatic terrain adjustment system.

The right hydraulic valve 44, best seen in FIG. 2, can generally be described as a 4-way "log splitter" hydraulic valve having a right single spring-actuated spool 64. One example embodiment of the right hydraulic valve 44 is a PRINCE 2508-T4-ESA1 hydraulic valve. However, other valves suited to the described functionality can also be used.

The illustrated right hydraulic valve 44 provides four ports including a right supply port 66, a right return port 68, a right A-port 70, and a right B-port 72. The right supply port 66 is fluidly coupled to a tractor hydraulic supply line while the right return port 68 is fluidly coupled to the tractor return line to establish a pressurized hydraulic system within which the right automatic depth controlling system 40 operates. The right A-port 70 and the right B-port 72 are fluidly coupled to the rear actuator 84 of the rear actuator assembly 48 via right hydraulic lines 50(a), 50(b), respectively.

The right hydraulic valve 44 is fixedly secured to the right vertical member 52 in a position that enables the right single spring-actuated spool 64 to directly interface with the right top member 54 of the right linkage 42. As the right linkage 42 moves up/down, responsive to the movement of the right forward wheel assembly 46 as it traverses an uneven terrain, the right top member 54 correspondingly depresses/releases the right single spring-actuated spool 64.

c. Right Forward Wheel Assembly.

The right forward wheel assembly 46 includes a rigid elongate right forward wheel support member 74 that presents two right wheel hubs 76(a), 76(b) about which right forward sensing wheels 78(a), 78(b) are rotatably mounted with right forward sensing wheel 78(b) positioned in-line behind right forward sensing wheel 78(a). The right forward wheel assembly 46 additionally includes a rigid vertical member 80, which is generally positioned central to the elongate right forward wheel support member 74. The rigid vertical member 80 has a first end fixedly secured to the elongate right forward wheel support member 74 and a second end fixedly secured to the right lower member 62 of the right linkage 42 proximate the pivotable connection between the right electrical actuator 56 and the right lower member 62 of the right linkage 42. The right forward wheel support member 74 and rigid vertical member 80 are preferably fabricated from steel or other suitable metal alloy.

In certain embodiments, a single wheel assembly replaces the right forward wheel assembly 46 wherein right forward wheel support member 74 is shortened in length while the right wheel hub 76(b) and the right forward sensing wheel 78(b) are eliminated. In certain embodiments, the two right forward sensing wheels 78(a), 78(b) are placed in a side-by-side orientation with the right forward wheel support member 74 serving as an axle to the right forward sensing wheels 78(a), 78(b). An example, single wheel configuration is illustrated in FIG. 3.

d. Rear Actuator Assembly.

The rear actuator assembly 48 includes a rear actuator mounting plate 82 and a rear actuator 84. The rear actuator mounting plate 82 has a first end that is fixedly secured to the rear member 23 of the agricultural implement 20 and a second end that extends beyond a height of the agricultural implement 20. The rear actuator 84 is a hydraulic actuator having a rear cylinder 86 and a rear rod 88. The rear cylinder 86 is fixedly secured to the rear actuator mounting plate 82 while the rear rod 88 is fixedly secured to the pivoting right extension arm 32 of the right wheeled support 30 of the agricultural implement 20.

The rear actuator 84 includes an extend flow port 90 that is hydraulically coupled to the right A-port 70 of the right hydraulic valve 44 via right hydraulic line 50(a) that enables extension of the rear rod 88 and a corresponding lowering of the right wheeled support 30 of the agricultural implement 20. The rear actuator 84 additionally includes a retract flow port 92 that is hydraulically coupled to the right B-port 72 of the right hydraulic valve 44 via the second right hydraulic line 50(b) that enables retraction of the rear rod 88 and a raising of the right wheeled support 30 of the agricultural implement 20.

D. Left Automatic Depth Controlling System

The left automatic depth controlling system 140 generally comprises a left linkage 142, a left hydraulic valve 144, a left forward wheel assembly 146, a forward actuator assembly 148, and left hydraulic lines 150(a), 150(b) that serve to fluidly couple the left hydraulic valve 144 to the forward actuator assembly 148. The left automatic depth controlling system 140 operates independently of the right automatic depth controlling system 40.

a. Left Linkage.

The left linkage 142 is generally a four-member linkage where each member of the left linkage 142 is of a rigid construction and a fixed length. More specifically, the left linkage 142 includes a left vertical member 152 that is fixedly secured to the forward member 22 of the agricultural implement 20. The left linkage 142 additionally includes a left top member 154 having a first end that is pivotally secured to a top end of the left vertical member 152. The left linkage 142 also includes a left electrical actuator 156 having a left cylinder 158 that is pivotally secured to a second end of the left top member 154 and a left piston rod 160 that is pivotally secured to a first end of a left lower member 162. The left electrical actuator 156, is electrically controlled, such as through use of a tractor electrical system, to maintain a predetermined setting to establish the left electrical actuator 156 as a fixed-length, rigid member within the left linkage 142. The left linkage 142 is completed with a second end of the left lower member 162 being pivotally secured to a bottom end of the left vertical member 152. Each of the left vertical member 152, left top member 154, left cylinder 158, left piston rod 160, and left lower member 162 are preferably fabricated from steel or other suitable metal alloy.

b. Left Hydraulic Valve.

The left hydraulic valve 144 can generally be described as a 4-way "log splitter" hydraulic valve having a left single spring-actuated spool 164. One example embodiment of the left hydraulic valve 144 is a PRINCE 2508-T4-ESA1 hydraulic valve. However, other valves suited to the described functionality can be used as an alternative.

The left hydraulic valve 144 provides four ports including a left supply port 166, a left return port 168, a left A-port 170, and a left B-port 172. The left supply port 166 is fluidly coupled to a tractor hydraulic supply line while the left return port 168 is fluidly coupled to the tractor return line to establish a pressurized hydraulic system within which the left automatic depth controlling system 140 operates. The left A-port 170 and the left B-port 172 are fluidly coupled to the forward actuator 184 of the forward actuator assembly 148 via left hydraulic lines 150(a), 150(b), respectively.

The left hydraulic valve 144 is fixedly secured to the left vertical member 152 in a position that enables the left single spring-actuated spool 164 to directly interface with the left top member 154 of the left linkage 142. As the left linkage 142 moves up/down, responsive to the movement of the left forward wheel assembly 146 as it traverses an uneven terrain, the left top member 154 correspondingly releases/depresses the left single spring-actuated spool 164.

c. Left Forward Wheel Assembly.

The left forward wheel assembly 146 includes a rigid elongate left forward wheel support member 174 that presents two left wheel hubs 176(a), 176(b) about which left forward sensing wheels 178(a), 178(b) are rotatably mounted with left forward sensing wheel 178(b) positioned in-line behind left forward sensing wheel 178(a). The left forward wheel assembly 146 additionally includes a rigid vertical member 180, which is generally positioned central to the elongate left forward wheel support member 174. The rigid vertical member 180 has a first end fixedly secured to the elongate left forward wheel support member 174 and a second end fixedly secured to the left lower member 162 of the left linkage 142 proximate the pivotable connection between the left electrical actuator 156 and the left lower member 162 of the left linkage 142. The left forward wheel support member 174 and rigid vertical member 180 are preferably fabricated from steel or other suitable metal alloy.

In certain embodiments, a single wheel assembly replaces the left forward wheel assembly 146 wherein left forward wheel support member 174 is shortened in length while the left wheel hub 176(b) and the left forward sensing wheel 178(b) are eliminated. In certain embodiments, the two left forward sensing wheels 178(a), 178(b) are placed in a side-by-side orientation with the left forward wheel support member 174 serving as an axle to the left forward sensing wheels 178(a), 178(b). An example, single wheel configuration is illustrated in FIG. 3.

d. Forward Actuator Assembly.

The forward actuator assembly 148 includes a forward actuator mounting plate 182 and a forward actuator 184. The forward actuator mounting plate 182 is centrally positioned and fixedly secured to the forward member 22 of the agricultural implement 20 at a front 39 of the agricultural implement 20. The forward actuator 184 is a hydraulic actuator having a forward cylinder 186 and a forward rod 188. The forward cylinder 186 is fixedly secured to the forward actuator mounting plate 182 while the forward rod 188 is fixedly secured to the cross member 29 of the tongue 26 of the agricultural implement 20.

The forward actuator 184 includes an extend flow port 190 that is hydraulically coupled to the left A-port 170 of the left hydraulic valve 144 via left hydraulic line 150(a) that enables extension of the forward rod 188 and a corresponding lowering of the front 39 of the agricultural implement 20 relative to the tongue 26 hitched to the implement-towing tractor. The rear actuator 184 additionally includes a retract flow port 192 that is hydraulically coupled to the left B-port 172 of the left hydraulic valve 144 via the left hydraulic line 150(b) that enables retraction of the rear rod 188 and a raising of the front 39 of the agricultural implement 20 relative to the tongue 26 hitched to the tractor-towing implement.

In certain embodiments, two forward actuator assemblies 148 can be used in place of a single forward actuator assembly 148. In the two forward actuator assembly configuration, one forward actuator assembly 148 is positioned between the forward member 22 of the agricultural implement 20 and the first arm 27(a) of the tongue 26 of the agricultural implement 20 while the other forward actuator assembly 148 is positioned between the forward member 22 of the agricultural implement 20 and the second arm 27(b) of the tongue 26. In the two forward actuator assembly configuration, the two forward actuator assemblies are connected in parallel and are operated simultaneously by the left hydraulic valve 144.

E. Operation of Preferred Embodiment

In use, the right and left hydraulic valves 44, 144 of the right and left automatic depth controlling systems 40, 140 are hydraulically coupled to the hydraulic supply and return lines of the hydraulic system of a tractor that will be towing the agricultural implement 20 to establish a consistently pressurized hydraulic system usable by the right and left automatic depth controlling systems 40, 140 to adjust a forward and rearward height of the agricultural implement 20.

The right automatic depth controlling system 40 operates independently of the left automatic depth controlling system 140. However, both the right automatic depth controlling system 40 and the left automatic depth controlling system 140 can operate simultaneously relative to the agricultural implement 20. In the instance that a user wishes to use only one of the right or left automatic depth controlling systems 40, 140, the user may disconnect the undesirable system from the 40, 140 from tractor-supplied hydraulic system.

a. Right Automatic Depth Controlling System.

With regard to the right automatic depth controlling system 40, the predetermined setting of the right electrical actuator 56 functions to define a zero depth of the terrain for the right depth controlling system 40 under the conditions of: (a) the hitch 28 secured to the implement-towing tractor; (b) the right forward sensing wheels 78(a), 78(b) resting on flat terrain (or a flat surface); (c) the right single spring-actuated spool 64 of the right hydraulic valve 44 being approximately half-way depressed by the right top member 54 of the linkage 42; and (d) the rear rod 88 of the rear actuator 84 being approximately half-extended such that the right wheels 34(a), 34(b) of the right wheeled support 30 of the agricultural implement 20 are resting on the flat terrain (or flat surface) similar to the right forward sensing wheels 78(a), 78(b). Once the zero depth of terrain is established, the right automatic depth controlling system 40 functions to sense a depth of terrain that is different from the zero depth.

For example, as the right forward sensing wheels 78(*a*), 78(*b*) of the right automatic depth controlling system 40 traverses the terrain, the right forward sensing wheels 78(*a*), 78(*b*) can move over terrain that is lower than zero depth resulting in the sensing of an increased terrain depth. Responsive to the increased terrain depth the right hydraulic valve 44 functions to direct the hydraulic flow through the right A-port 70 to the extend flow port 90 of the rear actuator 84 to extend the rear rod 88 causing the right wheeled support 30 to lower from its current position and lower the rearward height of the agricultural implement 20.

In another example, as the right forward sensing wheels 78(*a*), 78(*b*) of the right automatic depth controlling system 40 traverses the terrain, the right forward sensing wheels 78(*a*), 78(*b*) can move over terrain that is higher than zero depth resulting in the sensing of a negative terrain depth. Responsive to the decreased (or negative) terrain depth the right hydraulic valve 44 functions to direct the hydraulic flow through the right port-B 72 to the retract flow port 92 of the rear actuator 84 to retract the rear rod 88 causing the right wheeled support 30 to rise from its current position and increase the rearward height of the agricultural implement 20. As such, the right automatic depth controlling system 40 provides continuous automatic control of the rearward height of the agricultural implement 20 responsive to a sensed depth of terrain.

b. Left Automatic Depth Controlling System.

With regard to the left automatic depth controlling system 140, the predetermined setting of the left electrical actuator 156 functions to define a zero depth of the terrain for the left depth controlling system 140 under the conditions of: (a) the hitch 28 secured to the implement-towing tractor; (b) the left forward sensing wheels 178(*a*), 178(*b*) resting on the flat terrain (or flat surface); (b) the left single spring-actuated spool 164 of the left hydraulic valve 144 being approximately half-way depressed by the left top member 154 of the left linkage 142; and (c) the forward rod 188 of the forward actuator 184 being approximately half-extended such that the body structure 21 of the agricultural implement 20 is substantially parallel to the underlying flat terrain (or flat surface). Once the zero depth of terrain is established, the left automatic depth controlling system 140 functions to sense a depth of terrain that is different from the zero depth.

For example, as the left forward sensing wheels 178(*a*), 178(*b*) of the left automatic depth controlling system 140 traverses the terrain, the left forward sensing wheels 178(*a*), 178(*b*) can move over terrain that is lower than zero depth resulting in the sensing of an increased terrain depth. Responsive to the sensed increased terrain depth the left hydraulic valve 144 functions to direct the hydraulic flow through the left A-port 170 to the extend flow port 190 of the forward actuator 184 to extend the forward rod 188 causing the front 39 of the agricultural implement 20 to lower from its current position and the forward height of the agricultural implement 20 to lower.

In another example, as the left forward sensing wheels 178(*a*), 178(*b*) of the left automatic depth controlling system 40 traverses the terrain, the left forward sensing wheels 178(*a*), 178(*b*) can move over terrain that is higher than zero depth resulting in the sensing of a negative terrain depth. Responsive to the sensed increased (or negative) terrain depth the left hydraulic valve 144 functions to direct the hydraulic flow through the left port-B 172 to the retract flow port 192 of the forward actuator 184 to retract the forward rod 188 causing the front 39 of the agricultural implement 20 to rise from its current position, and the forward height of the agricultural implement 20 to increase. As such, the left automatic depth controlling system 140 provides continuous automatic control of the forward height of the agricultural implement 20 responsive to a sensed depth of terrain.

c. Hydraulic Flows.

Figure 4:
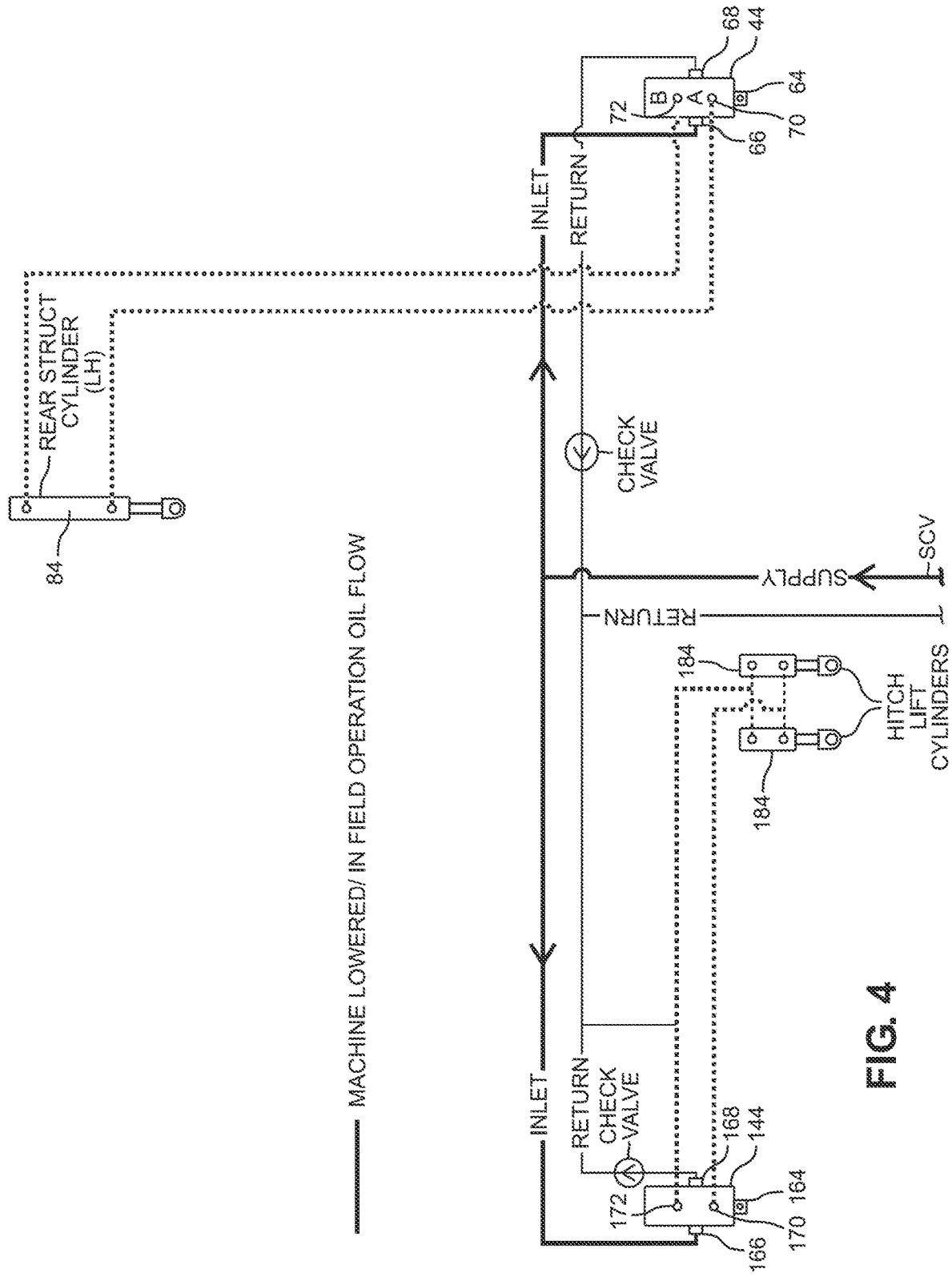
FIG. 4 illustrates the hydraulic fluid flow of an example hydraulic system during an automatic height lowering operation as executed by the automatic terrain adjustment system.

FIG. 4 illustrates an example hydraulic flow for lowering one or both of the right wheeled support 30 of the agricultural implement 20 utilizing the right automatic depth controlling system 40 and the front 39 of the agricultural implement 20 utilizing the left automatic depth controlling system 140. Tractor hydraulic supply and return lines are identified as well as the right hydraulic valve 44 and rear actuator 84 of the right automatic depth controlling system 40, and the left hydraulic valve 144 and two parallel forward actuators 184 of the left automatic depth controlling system 140.

Figure 5:
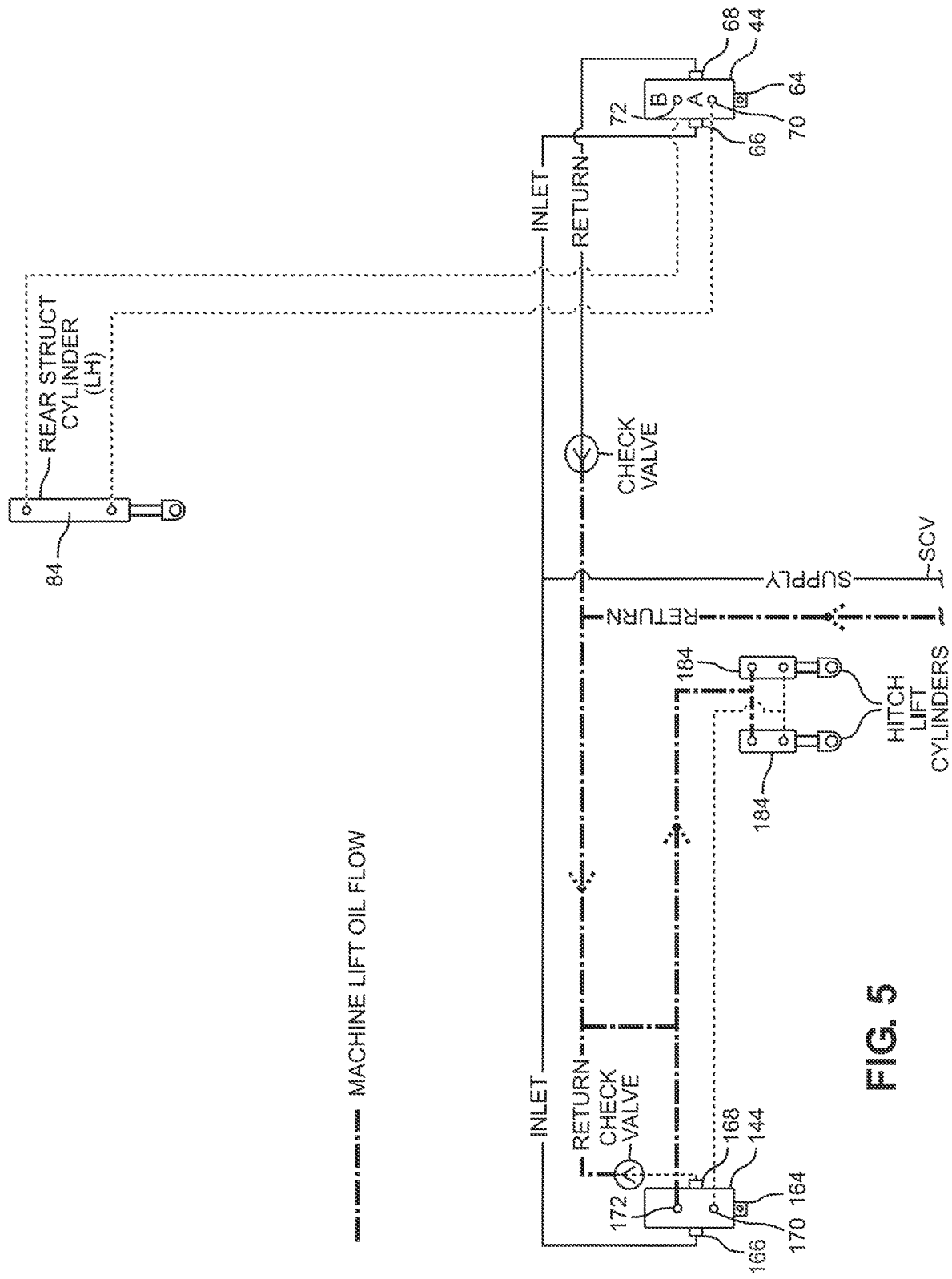
FIG. 5 illustrates the hydraulic fluid flow of an example hydraulic system during an automatic height lowering operation as executed by the automatic terrain adjustment system.

FIG. 5 illustrates an example hydraulic flow for lifting a front 39 of the agricultural implement 20 utilizing the left automatic depth controlling system 140. Tractor hydraulic supply and return lines are identified as well as the right hydraulic valve 44 and rear actuator 84 of the right automatic depth controlling system 40, and the left hydraulic valve 144 and two parallel forward actuators 184 of the left automatic depth controlling system 140.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. An automatic terrain adjustment system for an agricultural implement comprising:
    (a) a right automatic depth controlling system including:
        a right linkage that couples a right sensing wheel with a right valve, the right linkage secured to a forward member of the agricultural implement proximate a right side of the agricultural implement; and
        a right hydraulic actuator fluidly coupled to the right valve, the right hydraulic actuator connected between a rear member of the agricultural implement and a height-adjustable axle connected between two wheels that support the right side of the agricultural implement at a rear of the agricultural implement,
        wherein movement of the right linkage enables the right sensing wheel to sense a right depth of terrain as the right sensing wheel traverses the terrain while the agricultural implement is pulled by a tractor, and
        wherein, responsive to the right depth of terrain, the right valve supplies hydraulic fluid to the right hydraulic actuator to position the height-adjustable axle to a height corresponding to the right depth of terrain, and (b) a left automatic depth controlling system including:
a left linkage that couples a left sensing wheel with a left valve, the left linkage secured to the forward member of the agricultural implement proximate a left side of the agricultural implement; and
a left hydraulic actuator fluidly coupled to the left valve, the left hydraulic actuator connected between the forward member of the agricultural implement and a tongue of the agricultural implement,
wherein movement of the left linkage enables the left sensing wheel to sense a left depth of terrain as the left sensing wheel traverses the terrain while the agricultural implement is pulled behind the tractor, and
wherein, responsive to the left depth of terrain, the left valve supplies hydraulic fluid to the left hydraulic actuator to position a front of the agricultural implement to a height corresponding to the left depth of terrain.

2. The system of claim 1, wherein the right linkage comprises a linkage with four members.

3. The system of claim 2, wherein at least one of the four members of the right linkage comprises an electrical actuator.

4. The system of claim 3, wherein the electrical actuator has a predetermined set length that establishes a zero depth of the right sensing wheel.

5. The system of claim 1, wherein the right sensing wheel comprises at least two right sensing wheels.

6. The system of claim 5, wherein one of the at least two right sensing wheels is positioned behind and in-line with a second of the at least two right sensing wheels.

7. The system of claim 1, wherein the right valve includes a single spring-actuated spool.

8. The system of claim 7, wherein the single spring-actuated spool of the right valve is actuated by a member of the right linkage.

9. The system of claim 1, wherein the left linkage comprises a four-member linkage.

10. The system of claim 9, wherein at least one of the four members of the left linkage comprises an electrical actuator.

11. The system of claim 10, wherein the electrical actuator has a predetermined set length that establishes a zero depth of the left sensing wheel.

12. The system of claim 1, wherein the left sensing wheel comprises at least two left sensing wheels.

13. The system of claim 12, wherein one of the at least two left sensing wheels is positioned behind and in-line with a second of the at least two left sensing wheels.

14. The system of claim 1, wherein the left valve includes a single spring-actuated spool.

15. The system of claim 14, wherein the single spring-actuated spool of the left valve is actuated by a member of the left linkage.

16. The system of claim 1, wherein the agricultural implement comprises a defoliator.

17. An automatic terrain adjustment system for an agricultural implement comprising:

(a) a right automatic depth controlling system including:
a right four-member linkage coupled to a right sensing wheel and directly interfaced to a right hydraulic valve, the right four-member linkage secured to a forward member of the agricultural implement proximate a right side of the agricultural implement; and
a right hydraulic actuator fluidly coupled to the right hydraulic valve, the right hydraulic actuator connected between a rear member of the agricultural implement and a height-adjustable axle connected between two wheels that support the right side of the agricultural implement at a rear of the agricultural implement,
wherein movement of the right four-member linkage enables the right sensing wheel to sense a right depth of terrain as the right sensing wheel traverses the terrain while the agricultural implement is pulled by a tractor, and
wherein, responsive to the right depth of terrain, the right four-member linkage operates the right hydraulic valve to supply or withhold hydraulic fluid to the right hydraulic actuator to position the height-adjustable axle to a height corresponding to the right depth of terrain; and (b) a left automatic depth controlling system including:
a left four-member linkage coupled to a left sensing wheel and directly interfaced to a left hydraulic valve, the left linkage secured to the forward member of the agricultural implement proximate a left side of the agricultural implement; and
a left hydraulic actuator fluidly coupled to the left hydraulic valve, the left hydraulic actuator connected between the forward member of the agricultural implement and a tongue of the agricultural implement,
wherein movement of the left four-member linkage enables the left sensing wheel to sense a left depth of terrain as the left sensing wheel traverses the terrain while the agricultural implement is pulled behind the tractor, and
wherein, responsive to the left depth of terrain, the left four-member linkage operates the left hydraulic valve to supply or withhold hydraulic fluid to the left hydraulic actuator to position a front of the agricultural implement to a height corresponding to the left depth of terrain.

18. The system of claim 17, wherein at least one of the four members of each of the right four-member linkage and the left four-member linkage comprises an electrical actuator.

19. The system of claim 18, wherein the electrical actuator of the right four-member linkage has a predetermined set length that establishes a zero depth of the right sensing wheel.

20. The system of claim 19, wherein the electrical actuator of the left four-member linkage has a predetermined set length that establishes a zero depth of the left sensing wheel.

* * * * *